United States Patent [19]

Moore, deceased et al.

[11] Patent Number: 5,067,414

[45] Date of Patent: Nov. 26, 1991

[54] SELF-ADJUSTING SHOCK ABSORBING CARRIER

[75] Inventors: Archie S. Moore, deceased, late of Kansas City, Mich., by Rosalie I. Moore, personal representative; Robert J. Teske, Eudora, Kans.; Gareth D. Summa, Riverside, Mich.

[73] Assignee: Mid-West Conveyor Company, Inc., Kansas City, Kans.

[21] Appl. No.: 627,184

[22] Filed: Dec. 13, 1990

Related U.S. Application Data

[63] Continuation-in-part of Ser. No. 478,686, Feb. 12, 1990.

[51] Int. Cl.⁵ ............................................. B61B 12/04
[52] U.S. Cl. ................................. 104/172.2; 104/172.3
[58] Field of Search ............... 104/172.1, 172.2, 172.3, 104/172.4, 89; 198/343.1, 343.2, 465.4, 465.1, 803.01

[56] References Cited

U.S. PATENT DOCUMENTS

| | | |
|---|---|---|
| 1,141,696 | 6/1915 | Fernanzo . |
| 1,294,467 | 2/1919 | Hovas . |
| 2,125,617 | 8/1938 | Niemann . |
| 2,667,237 | 1/1954 | Rabinow . |
| 2,823,915 | 2/1958 | De Carbon . |
| 3,044,416 | 7/1962 | Reibel et al. . |
| 3,053,526 | 9/1962 | Kendall . |
| 3,085,659 | 4/1963 | Ashmead . |
| 3,107,753 | 10/1963 | Georgette . |
| 3,110,367 | 11/1963 | Roberts . |
| 3,251,270 | 5/1966 | Seifried . |
| 3,361,084 | 1/1968 | Ellzey . |
| 3,397,650 | 8/1968 | Kondur et al. . |
| 3,417,660 | 12/1968 | Harbrecht . |
| 3,478,698 | 11/1969 | Jones . |
| 3,589,528 | 6/1971 | Stephenson . |
| 3,690,423 | 9/1972 | Trongeau . |
| 3,720,172 | 3/1973 | Dehne . |
| 3,804,447 | 4/1974 | Slavin . |
| 3,926,125 | 12/1975 | Orwin . |
| 3,938,625 | 2/1976 | Rapermacher et al. . |
| 4,011,929 | 3/1977 | Jeram . |
| 4,013,015 | 3/1977 | Fromme et al. . |
| 4,019,403 | 4/1977 | Kondo et al. . |
| 4,122,778 | 10/1978 | DiRosa . |
| 4,173,130 | 11/1979 | Sutliff et al. . |
| 4,790,247 | 12/1988 | Summa . |

*Primary Examiner*—D. Glenn Dayoan
*Attorney, Agent, or Firm*—Litman, McMahon & Brown

[57] ABSTRACT

A self-adjusting shock absorbing carrier for inverted powder and free conveyors includes a telescoping tubular main carrier frame with a support trolley connected to a rear end of an outer tube and a drive trolley connected to a front end of an inner tube of the frame. Tubular friction pads are positioned between the inner and outer tubes and located so that the weight of a load supported by the main frame determines the frictional engagement between the inner and outer tubes and the friction pads. When the drive trolley is abruptly engaged by a pusher dog on a conveyor drive chain or when the drive trolley is abruptly braked, the shock generated thereby is dissipated in frictional resistance to relative movement between the inner and outer tubes to thereby cushion startup and braking of the carrier.

20 Claims, 2 Drawing Sheets

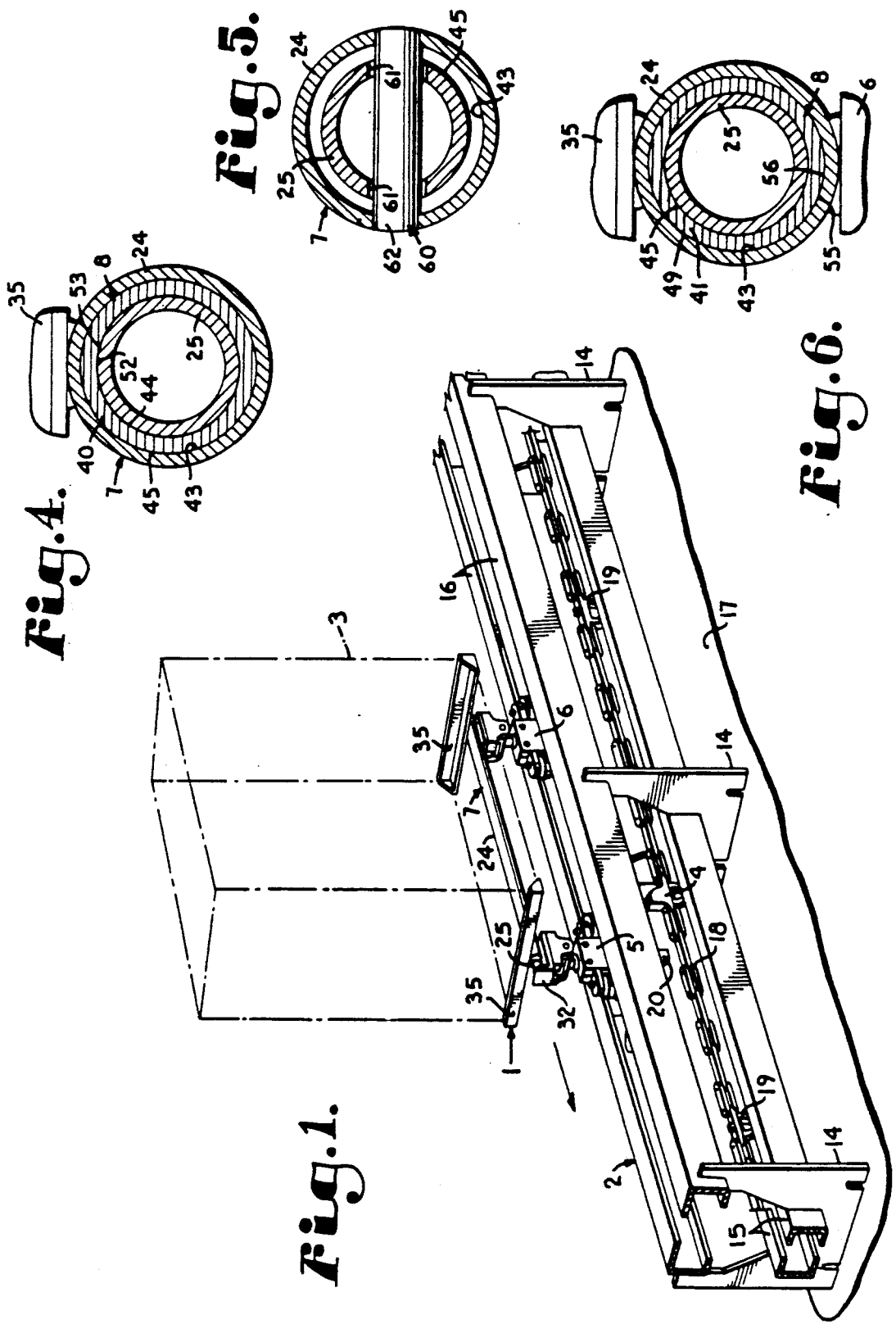

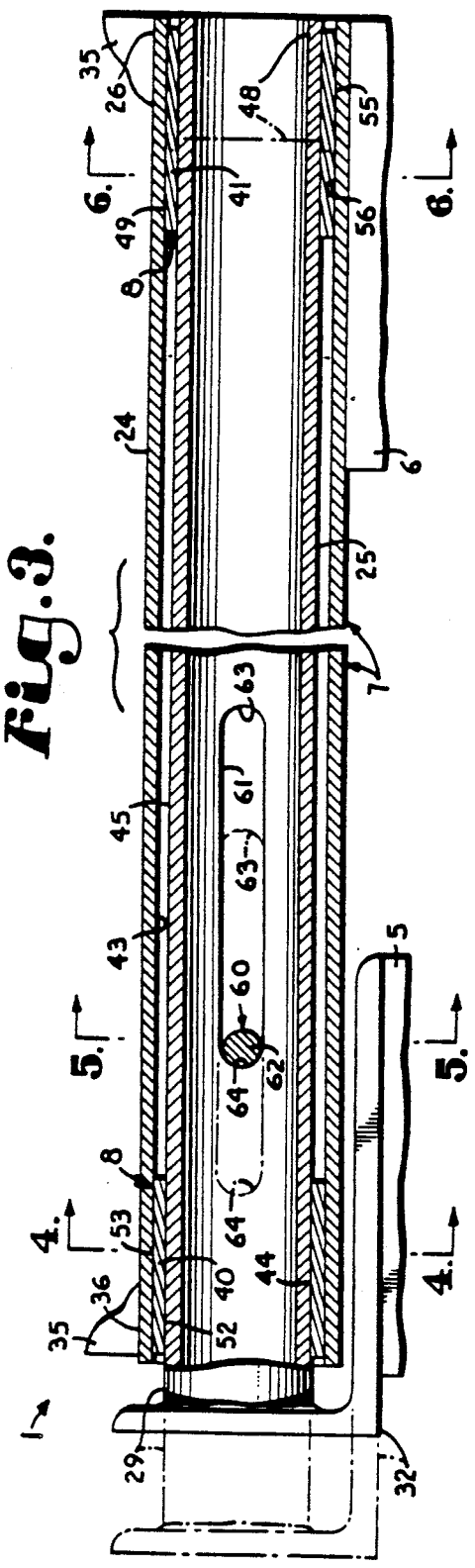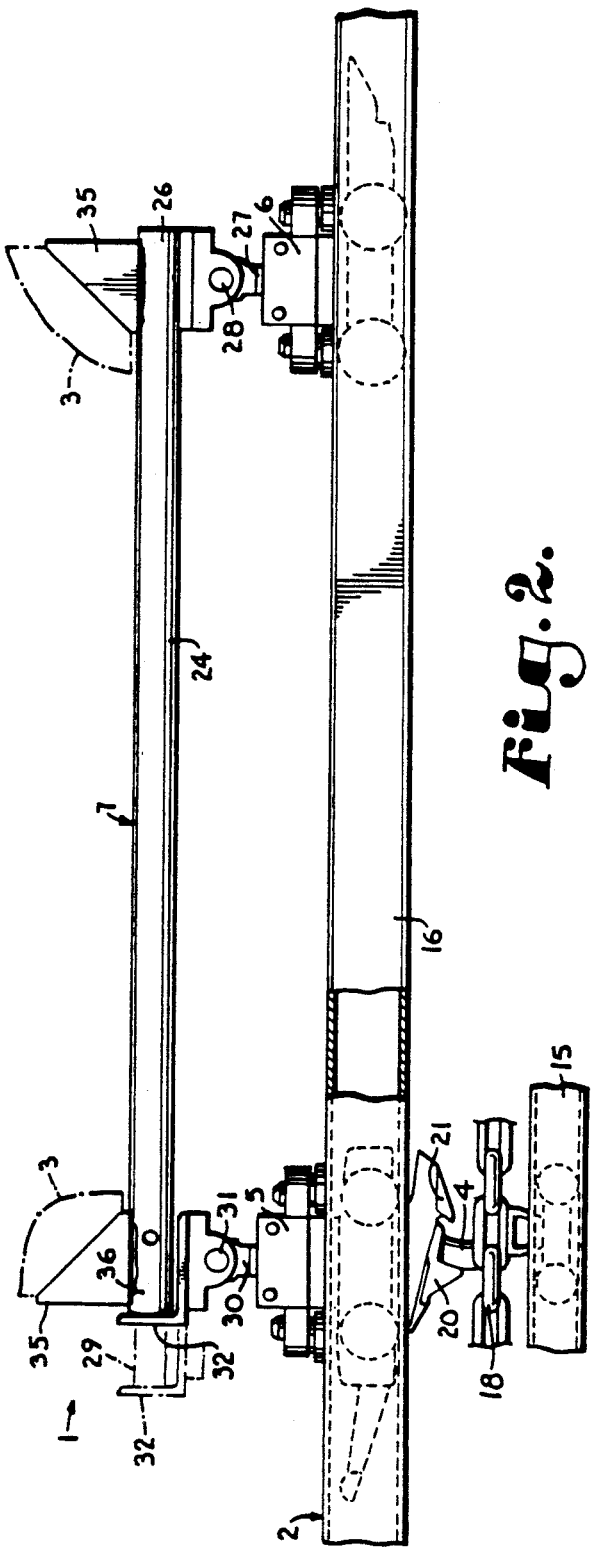

SELF-ADJUSTING SHOCK ABSORBING CARRIER

CROSS-REFERENCE TO RELATED APPLICATION

This application is a continuation-in-part of Ser. No. 07/478,686 filed Feb. 12, 1990, entitled SHOCK ABSORBING CARRIER, which is which is assigned to the same assignee as the present application and which is incorporated herein by reference.

FIELD OF THE INVENTION

The present invention relates to inverted power and free conveyors and, more particularly, to a self-adjusting, frictional shock absorbing load carrier arrangement for such a conveyor.

BACKGROUND OF THE INVENTION

In typical power and free conveyors, a load carrier is mounted on a load trolley or trolleys which run on a load or free track. The load carrier is moved by a continuously running power or drive chain by engagement between a drive or pusher dog on the drive chain and a retractable trolley dog on the load carrier or trolley. The drive chain is supported by power trolleys running along a power track. In overhead power and free conveyors, a load supported by the load carrier is suspended below the tracks carrying the load trolleys and the drive chain. The pusher dog extends downward to engage an upwardly extending trolley dog. The trolley dog may be retracted from the pusher dog to allow the load to coast on a downhill section of the load track, to halt the load for operations thereon, or the like. On many power and free conveyors, the load trolleys incorporate accumulation mechanisms which cause drive disengagement of carriers approaching behind a halted carrier to prevent collisions between the carriers.

Inverted power and free conveyors are similar to overhead power and free conveyors except that, as their name suggests, they are turned upside down. On inverted power and free conveyors, a power track supporting the power trolleys carrying the drive chain is at the lowest level. Above the power track is the load or free track supporting the load trolleys, with the load carrier above the load track. The pusher dogs of inverted power and free conveyors extend upward to engage downwardly extending trolley dogs which may be retracted to disengage drive from the load for the same reasons as for overhead track conveyors. Both overhead and inverted power and free conveyors find application in factories, such as on automotive assembly lines to carry automotive bodies as manufacturing operations are performed, in large appliance manufacturing plants, and the like.

Carriers, particularly for inverted power and free conveyors, are usually provided with two spaced apart load trolleys to stabilize the load from pivoting about a lateral axis. The load carrier structure extends between the two load trolleys and has the load clamped, or otherwise temporarily fastened, thereto. Load carriers for overhead power and free conveyors may also be provided with two spaced apart load trolleys to control swinging or rocking about a lateral axis. One of the problems of operating a power and free conveyor is that the engagement of a drive dog on the drive chain with the trolley dog is often abrupt. That is, a stationary load carrier is jerked into motion with minimal slowdown of the drive chain. Braking of the load carriers is also often abrupt. Shock generated by this abrupt engagement of the drive dog with the load carrier or braking of the carrier can be transferred to the load carried with the possibility of damage to the load or disengagement of the load from the load carrier.

In order to reduce the transmission of shock to carried loads from the startup and braking of the load carriers and reactions in the drive chain to engagement of a pusher dog to a trolley dog on a carrier, which may be transmitted to other loads carried on the conveyor, various shock absorbing arrangements have been devised. The simplest types of shock absorbers involve resilient padding, such as rubber bushings or the like which are positioned in connecting parts between the load trolleys and the carrier frame. Such padding is only marginally effective in reducing the transmission of shocks to the loads. Other types of shock absorbers involve the use of springs between sliding connections of the trolleys and carrier frame. The principal problem with springs alone is that once compressed, for example, they recover resiliently and often cause periodic motion or longitudinal bouncing of the load in the direction of travel. Such bouncing of the load strains the load, possibly damaging it, and is often almost as undesirable as an abrupt change in motion.

The most effective types of shock absorbing devices for conveyors of this type are those which damp the shock without converting it to bouncing motion or vibrations. Such devices operate in a manner similar to automotive suspension type shock absorbers and may be similar in construction. Shock absorbers of this type are typically hydraulic or pneumatic cylinders with sliding pistons therein which retard relative movement of the piston and cylinder by forcing the contained fluid through an orifice in the piston. Shock loads applied to one of the members is dissipated in viscous resistance to the flow of the fluid through the orifice and reduced in intensity and abruptness prior to application as motion to the other member of the device. Another known type of shock absorbing device, which operates in a manner analogous to fluid shock absorbers, involves a cylinder filled with a particulate material, such as metal shot or ball bearings, and has a type of piston moving through the material. In this type of cylinder, the shock is dissipated as the piston moves through the material by friction among the particles of the material and, to some degree, inertia of the particles.

Known conveyor arrangements employing true shock damping devices typically employ two trolleys to support the load carrier and load and a third drive trolley connected to the leading support trolley by the shock absorber. Such an arrangement increases the length of the carrier assembly required for each load, resulting in fewer loads capable of being positioned on a given length of conveyor or accumulation zone. Additionally, economic resources are wasted in the third trolley which does not actually support a load.

SUMMARY OF THE INVENTION

The present invention provides a shock absorbing load carrier, particularly for inverted power and free conveyors, which is more compact than previously known shock absorbing carrier arrangements and which does not require any trolleys which do not support the load being carried. The load carrier of the present invention includes a carrier frame formed by a pair of telescoping frame members, an inner frame member connected to a leading drive trolley and an outer frame member connected to a trailing support trolley of the carrier. A framework is affixed to the outer frame member for connection of a load article to the carrier during transit on the conveyor. The drive trolley has a trolley dog depending therefrom which is engaged by a pusher dog on a drive chain of the conveyor for movement of the carrier along the conveyor. Both the support trolley and the drive trolley support the weight of the load and carrier on a load or free track of the conveyor.

Relative movement of the inner and outer frame members is retarded by a shock absorbing arrangement engaged therebetween. In a preferred embodiment of the present invention, the tubular inner and outer carrier frame members are frictionally engaged in such a manner that the weight of a load supported by the carrier determines the frictional resistance to telescoping movement of the inner frame member relative to the outer frame member. By this arrangement, shock generated by abrupt engagement of a pusher dog with the drive trolley, or by abrupt braking of the drive trolley, is damped by the friction between the inner frame member and the outer frame member in proportion to the weight of the carrier load.

The inner and outer frame members are separated by tubular friction members. A front friction member is affixed to the inner cylindrical surface at the front end of the outer frame member and has a front portion of the inner frame member extending therethrough. A tubular rear friction member is affixed to the outer cylindrical surface at the rear end of the inner member to engage the inner surface of a rear portion of the outer member. Load brackets, forming the load supporting framework, are affixed to the outer surface of the ends of the outer member. The drive and support trolleys engage the telescoping carrier frame respectively at the front end of the inner frame member and the rear end of the outer frame member.

It can be shown by a free body analysis of the carrier and load system that the frictional resistance force to telescoping of the inner frame member relative to the outer frame member is directly proportional to the weight of the load supported by the carrier. Principally, the weight of the load is applied between the carrier frame members as a "normal", or perpendicularly downward, force between the upper internal surface of the front friction member and the upper outside surface of the front portion of the inner frame member and between a lower external surface of the rear friction member and a lower internal surface of the rear portion of the outer frame member. The telescoping frame assembly is provided with a telescoping limit to control how far the inner member can extend from the outer frame member. A telescoping limit pin extends diametrically between the walls of the outer frame member, and the inner frame member has an elongated slot through which the limit pin extends. Engagement of the limit pin with the ends of the slot controls the extension and retraction of the inner frame member with respect to the outer frame member.

OBJECTS OF THE INVENTION

The principal objects of the present invention are: to provide an improved load carrier for power and free conveyors; to provide, particularly, an improved shock absorbing arrangement for a load carrier to reduce the transmission to a load of shocks caused by abrupt startup and braking of the carrier; to provide such a shock absorbing load carrier which is more compact and requires fewer load trolleys than conventional shock absorbing carriers; to provide such a load carrier which damps the transmission of shocks without causing bouncing movements or significant vibrations to be introduced in the load; to provide such a load carrier in which the shock absorbing arrangement does not require the use of liquids which may leak; to provide such a load carrier including a telescoping main frame formed of intersleeved outer and inner tubular frame members with a shock absorbing arrangement engaged between the frame members and retarding relative movement therebetween; to provide such a load carrier wherein a load supporting framework is mounted on the outer member and a support trolley is connected to a rear end thereof; to provide such a load carrier wherein the inner member extends from a front end of the outer member and has a drive trolley connected to a front end thereof, the drive trolley having a trolley dog projecting therefrom for engagement by a drive dog to propel the carrier along a power and free conveyor; to provide such a load carrier which automatically varies the amount of shock retarding resistance to relative movement of the tubular frame members according to the weight of the load carried by the carrier; to provide such a load carrier including friction pads sleeved between the inner and outer tubular members which are positioned at the front and rear ends of the members so that the weight of the load increases the frictional contact between the frame members and the friction pads; to provide such a load carrier which is adaptable to both overhead and inverted power and free conveyors; to provide such a load carrier which is also adaptable to other types of conveyors and conveyances; and to provide such a shock absorbing load carrier which is economical to manufacture, durable and effective in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary perspective view of an inverted power and free conveyor employing a self-adjusting shock absorbing carrier embodying the present invention.

FIG. 2 is an enlarged fragmentary side elevational view of the self-adjusting shock absorbing carrier with an extended condition of the carrier shown in phantom lines.

FIG. 3 is a further enlarged, fragmentary longitudinal sectional view of a frictional shock absorber assembly of the carrier with an extended condition of the shock absorber shown in phantom lines.

FIG. 4 is a transverse sectional view taken on line 4—4 of FIG. 3 and illustrates details of a tubular front friction pad of the shock absorber assembly.

FIG. 5 is a transverse sectional view taken on line 5—5 of FIG. 3 and illustrates details of a telescoping limit pin of the shock absorber assembly.

FIG. 6 is a transverse sectional view taken on line 6—6 of FIG. 3 and illustrates details of a tubular rear friction pad of the shock absorber assembly.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a shock absorbing load carrier for an inverted power and free conveyor 2 and embodying the present invention. The carrier 1 is configured to prevent the transmission, to a load 3 conveyed on the carrier 1, of shocks generated by abrupt engagement of a pusher dog 4 of the conveyor 2 with a drive trolley 5 of the carrier 1 as well as abrupt braking of the trolley 5. The carrier 1 includes a support trolley 6 connected to a rear end of a telescoping, tubular carrier main frame 7 in spaced relation to the drive trolley 5 at a front end of the frame 7. The carrier frame 7 has a self-adjusting shock absorbing arrangement 8 therein which retards relative movement of the telescoping members of the frame 7 in proportion to the weight of the load 3 conveyed on the carrier 1.

The illustrated conveyor system 2 is a conventional inverted power and free conveyor and includes standards 14 supporting a power or drive track 15 and a free or load track 16 above a surface 17 which may be a floor of the plant in which the conveyor system 2 is installed or the floor of a trench formed below the level of a main floor. The free track 16 is formed by a pair of inwardly turned channels which support the drive trolley 5 and support trolley 6. The power track 15 is similar to the free track 16 and is illustrated as a pair of mutually inwardly turned channels. The conveyor 2 includes a power or drive chain 18 supported on the power track 15 by power trolleys 19 spaced along the chain 18. Also distributed along the chain 18 are the pusher dogs 4.

The drive trolley 5 has a retractable trolley dog 20 which is extended to be engaged by a pusher dog 4 or retracted for braking the carrier 1 or for free movement of the carrier 1 along the conveyor 2. The drive trolley 5 may also include a holdback dog 21 to restrain the carrier 1 from runaway when moving down an inclined section of the conveyor 2. During operation of the conveyor 2, the chain 18 is continuously driven and engagement and disengagement of the carrier 1 is controlled by controlling the position of the drive dog 20. Although the trolley 5 is referred to as a drive trolley, it also supports the weight of the load 3 and carrier 1 on the conveyor 2.

The telescoping carrier main frame 7 is formed of an outer tubular frame member of outer tube 24 and an inner tubular frame member or inner tube 25 slidably received within the outer tube 24. The support trolley 6 is pivotally connected to a rear end 26 of the outer tube 24 by a vertical pivot joint 27 for pivoting of the tube 24 about a vertical axis relative to the support trolley and by a transverse pivot joint 28 for pivoting about a transverse axis. Similarly, the drive trolley 5 is pivotally connected to a front end 29 of the inner tube 25 by a vertical pivot joint 30 and a transverse pivot joint 31. In the illustrated carrier 1, the transverse pivot 31 is connected to the inner tube 25 by an L-bracket 32. The pivot joints 27, 28, 30, and 31 allow pivoting of either of the trolleys 5 and 6 relative to the main frame 7 as for following transitions between level and inclined sections of the conveyor 2 and for following lateral curves of the conveyor 2. The outer tube 24 has load support brackets 35 attached thereto, as by welding, at the rear end 26 and at a front end 36 thereof. In normal operation of the conveyor 2, the load 3 is temporarily fastened of clamped to the load brackets 35.

In a preferred embodiment of the carrier 1, the shock absorbing arrangement 8 includes front and rear friction pads 40 and 41 positioned between the inner and outer tubes 25 and 24 to frictionally retard relative movement therebetween. The friction pads 40 and 41 may be annular segments and are illustrated as fully cylindrical tubular members. The material from which the friction pads 40 and 41 are formed depends upon the material forming the inner and outer tubes 25 and 24 and their surface finishes and the degree of damping desired. The material constituting the friction pads 40 and 41 may, for example, be somewhat similar to the types of materials used for automotive brakes, although the pads 40 and 41 do not require the same degree of ruggedness as automotive brake material since they will not be subjected to the severity of use that automotive brakes are. The front friction pad 40 is mounted on an inner surface 43 of the outer tube 24 near its front end 36 and has an inner surface 44 which frictionally engages an outer surface 45 of the inner tube 25. Conversely, the rear friction pad 41 is mounted on the outer surface 45 of the inner tube 25 near its rear end 48 and has an outer surface 49 which engages the inner surface 43 of the outer tube 24. The friction pads 40 and 41 may be secured respectively to the outer tube 24 and the inner tube 25 by any suitable means, such as by adhesive bonding, mechanical mounting, or the like.

The fit between the inner surface 44 of the front friction pad 40 and the outer surface 45 of the inner tube 25 and between the outer surface 49 of the rear friction pad 41 and the inner surface 43 of the outer tube 24 is somewhat loose to control the areas of frictional contact between the friction pads 40 and 41 and the inner and outer tubes 25 and 24. The desired areas of frictional engagement are between an upper cylindrical sector 52 of the inner surface 44 of the front friction pad 40 and an upper cylindrical sector 53 of the outer surface 45 of the inner tube 25 and between a lower cylindrical sector 55 of the outer surface 49 of the rear friction pad 41 and a lower cylindrical sector 56 of the inner surface 43 of the outer tube 24. (See FIGS. 3, 4, and 6.)

The load support brackets 35 are attached to the outer tube 24 at the opposite ends 36 and 26 thereof. The outer tube 24 is supported at the rear end 26 by the support trolley 6 and at the front end 36 by the drive trolley 5 by way of the L-bracket 32 and the inner tube 25. Thus, a portion of the weight of the load 3 is applied downwardly to the front end 36 of the outer tube 24 which causes the upper sector 52 of the inner surface 44 of the front pad 40 to be pressed against the upper sector 53 of the outer surface 45 of the inner tube 25. Because of the slightly loose fit respectively between the friction pads 40 and 41 and the tubes 25 and 24, the portion of the weight of the load 3 applied to the front end 36 of the outer tube 24 tends to urge the tubes 25 and 24 to be skewed toward their middle portions, particularly as the inner tube 25 is extended from the outer tube 24. This causes a portion of the weight of the load 3 to be applied between the lower sector 55 of the outer surface 49 of the rear pad 41 and the lower sector 56 of the inner surface 43 of the outer tube 24.

Frictional forces tending to resist relative longitudinal movement between the inner tube 25 and the outer tube 24 are functions of the "normal" forces and the coefficients of friction between the respective surfaces of the friction pads 40 and 41 and the inner and outer tubes 25 and 24. It can be shown by conventional free body analysis of the components of the main carrier frame 7, and load 3, and the trolleys 5 and 6 that the normal forces between the friction pads 40 and 41 and the inner and outer tubes 25 and 24 are directly proportional to the weight of the load 3. Thus, extension and retraction of the inner tube 25 with respect to the outer tube 24 is retarded in proportion to the weight of the load 3, and the carrier 1 is thereby self-adjusting with regard to its shock absorbing capabilities. Since heavier loads 3 have higher starting and stopping inertias, varying the resistance to relative movement between the inner and outer tubes 25 and 24 in proportion to the weight of the load 3 results in a more nearly constant cushioning effect with regard to the transfer of motion from a pusher dog 4 to the load 3.

At the instant of engagement between a pusher dog 4 on the drive chain 18 and the trolley dog 20 on the drive trolley 5, a small amount of shock may be transmitted to the load 3 and the chair 18 as static friction between the friction pads 40 and 41 and the inner and outer tubes 25 and 24 is overcome. After the initial static friction is overcome and the inner tube 25 starts to be drawn from the outer tube 24, the dynamic friction between the friction pads 40 and 41 and the inner and outer tubes 25 and 24 retards the extension of the inner tube 25 to slow the acceleration of the load 3, thereby cushioning the transfer of motion and reducing the tendancy of the load 3 to be tumbled in the direction opposite the movement of the pusher dog 4.

The carrier main frame 7 is provided with a telescoping limit arrangement 60 to control the degree of extension of the inner tube 25 from the outer tube 24. Referring to FIGS. 3 and 5, the limit arrangement 60 includes a pair of aligned longitudinal slots 61 formed through the sides of the cylindrical wall of the inner tube 25 and a telescoping limit rod or pin 62 extending diametrically between opposite sides of the cylindrical wall of the outer tube 24. The pin 62 extends through the slots 61, and engagement of the pin 62 with the rear end surfaces 63 of the slots 61 provides a positive limit to extension of the inner tube 25 from the outer tube 24. Similarly, engagement between the pin 62 and front end surfaces 64 of the slots 61 limits retraction of the inner tube 25 within the outer tube 24. The pin 62 is preferably slightly smaller in diameter than the thickness of the slots 61 to avoid interference with the desired frictional relationship of the front friction pad 40 and the inner tube 25.

After the carrier 1 has been set into motion and the rear surfaces 63 of the slots 61 have engaged the limit pin 62, the inner tube 25 remains extended during travel on the conveyor 2. The carrier 1 is brought to a halt by disengaging the trolley dog 20 from the pusher dog 4 and placing a stop member (not shown) in front of the drive trolley 5. An exemplary trolley stop arrangement is disclosed in U.S. Pat. No. 4,790,247, which is incorporated herein by reference. Such arrangements tend to brake carriers in an abrupt manner. Upon engagement of the drive trolley 5 of the carrier 1 with such a brake, the extended inner tube 25 is driven back into the outer tube 24 against the frictional resistance provided by the pads 40 and 41 engaging the inner and outer tubes 25 and 24 to cushion the braking of the loaded carrier 1.

The tubes 24 and 25 of the frame 7 are illustrated as having circular cross sections. Because of this, the support trolley 6 supports the weight of the load 3 and additionally resists lateral tipping moments of the load 3, as when the carrier 1 is conveyed about a lateral curve of the conveyor 2. Because of the circular cross section of the tubes 24 and 25, the inner tube 25 would be free to twist relative to the outer tube 24 with only the telescoping limit pin 62 to resist such twisting. This is not a problem for light to moderate weight and sized loads 3, such as refrigerators and similar appliances. However, for heavier loads, such as automotive bodies, and severely top heavy loads, it is foreseen that it might be desirable to form the tubes 24 and 25 from noncircular cross section stock, such as rectangular or square tube stock. This would enable the drive trolley 5 to carry some of the lateral tipping loads of the carrier 1. Such variations in the cross sectional shape of the frame members 24 and 25 are considered to fall within the scope of the present invention.

The carrier 1 of the present invention provides a shock absorbing arrangement 8 which is incorporated within the carrier 1 itself. This omits the need for a third trolley for each load 3 carried and decreases the length of the conveyor 2 needed to accommodate each load carried. The use of a frictional type of shock absorbing arrangement 8 simplifies and economizes the construction of same in comparison to conventional hydraulic and pneumatic shock absorbers and particulate types of shock absorbers.

It is to be understood that while certain forms of the present invention have been illustrated and described herein, it is not to be limited to the specific forms or arrangement of parts described and shown.

What is claimed and desired to be secured by Letters Patent is as follows:

1. A self-adjusting shock absorbing load carrier for a conveyor including means forming a carrier support surface and a carrier drive member engageable with said carrier to propel same along said support surface, said carrier comprising:
   (a) an elongated carrier frame member adapted for supporting a load;
   (b) a support trolley connected to said frame member and adapted to engage said support surface for movement therealong;
   (c) a drive trolley adapted to engage said support surface, to at least partially support said load, and to be drivingly engaged by said drive member to propel said carrier along said support surface; and
   (d) friction means movably engaging said drive trolley with said frame member and causing frictional resistance to relative movement therebetween in proportion to a weight of said load supported by said frame member whereby shock generated by engagement of said drive member with said drive trolley and braking thereof is damped to reduce transmission of said shock to said load.

2. A carrier as set forth in claim 1 wherein said friction means includes:

(a) said drive trolley including an elongated drive frame member;
(b) said drive frame member being slidably engaged with said carrier frame member; and
(c) said friction means being attached to one of said drive frame member and said carrier frame member and being positioned in such a manner that said load causes frictional engagement between said friction means and the other of said drive frame member and said carrier frame member in proportion to said weight of said load.

3. A carrier as set forth in claim 1 wherein:
(a) said frame member has a front end and a rear end;
(b) said support trolley is connected to said frame member at said rear end; and
(c) said drive trolley is connected to said frame member by said friction means generally at said front end of said frame member.

4. A self-adjusting shock absorbing load carrier for a conveyor including means forming a carrier support surface and a carrier drive member engageable with said carrier to propel same along said support surface, said carrier comprising:
(a) an elongated and extendible carrier frame adapted for supporting a load, said frame including a first frame member and a second frame member, said first and second frame members being engaged in such a manner as to enable limited relative sliding movement therebetween;
(b) a first trolley connected to said first frame member and a second trolley connected to said second frame member, each of said trolleys being adapted to engage said support surface for movement therealong, one of said trolleys being adapted to be drivingly engaged by said drive member to propel said carrier along said support surface; and
(c) friction means engaged between said first and second frame members and causing frictional resistance to relative movement therebetween in proportion to a weight of said load supported by said frame whereby shock generated by engagement of said drive member with said one trolley and braking thereof is damped to reduce transmission of said shock to said load.

5. A carrier as set forth in claim 4 wherein:
(a) one of said frame members is tubular and has the other of said frame members sleeved therein; and
(b) said friction means is engaged between said carrier frame members.

6. A carrier as set forth in claim 4 wherein:
(a) said first frame member is tubular and has a front end and a rear end;
(b) said first trolley is connected to said first frame member at said rear end;
(c) said second frame member has a front end and a rear end and is sleeved within said first frame member with said front end of said second frame member extending from said front end of said first frame member; and
(d) said second trolley is connected to said front end of said second frame member.

7. A carrier as set forth in claim 6 wherein:
(a) said second trolley is adapted to be drivingly engaged by said drive member.

8. A carrier as set forth in claim 6 wherein said friction means includes:
(a) a friction member positioned within said first frame member at said front end in such a manner that a front end portion of said second frame member frictionally engages said friction member upon extension and retraction of said second frame member with respect to said first frame member.

9. A carrier as set forth in claim 8 wherein:
(a) said friction member is tubular and is fixed within said first frame member in surrounding frictional engagement with said second frame member.

10. A carrier as set forth in claim 8 and including:
(a) a second friction member positioned on said second frame member in such a manner as to frictionally engage an inner surface of said first frame member during said extension and retraction of said second frame member.

11. A carrier as set forth in claim 10 wherein:
(a) said second friction member is tubular and is fixed in surrounding relation to said second frame member and in peripheral frictional engagement with an inner surface of said tubular first frame member.

12. A carrier as set froth in claim 6 and including:
(a) load bracket means connected to said first frame member, said bracket means being adapted to receive and stabilize a load on said carrier.

13. A carrier as set forth in claim 6 and including:
(a) limit means engaged between said first and second frame members and limiting extension and retraction of said second frame member with respect to said first frame member.

14. A carrier as set forth in claim 13 wherein said limit means includes:
(a) an elongated slot having opposite ends and formed through said second frame member and extending longitudinally thereof; and
(b) a limit pin extending diametrically through said tubular first frame member, said pin being oriented to extend through said slot in said second frame member, engagement of said pin with said ends of said slot limiting said extension and retraction of said second frame member.

15. A self-adjusting shock absorbing load carrier for a power and free conveyor including a carrier supporting track and a drive chain engageable with said carrier to propel same along said track, said carrier comprising:
(a) an elongated and tubular outer carrier frame member having a front end and a rear end and adapted for supporting a load;
(b) an elongated and tubular inner carrier frame member having a front end and a rear end and being sleeved within said outer carrier member whereby said front end of said inner frame member is extendible from said front end of said outer frame member;
(c) a support trolley connected to said rear end of said outer frame member and being adapted to engage said track for movement therealong;
(d) a drive trolley connected to said front end of said inner frame member and being adapted to engage said track and to be drivingly engaged by said drive chain to propel said carrier along said track; and
(e) friction means engaged between said first and second frame members and causing a frictional resistance to relative movement therebetween in proportion to a weight of said load supported by said frame whereby shock generated by engagement of said drive chain with said drive trolley and braking thereof is damped to reduce transmission of said shock to said load.

16. A carrier as set forth in claim 15 wherein said friction means includes:
(a) a front friction member positioned within said outer frame member at said front end in such a manner that a front end portion of said inner frame member frictionally engages said front friction member upon extension and retraction of said inner frame member with respect to said outer frame member; and
(b) a rear friction member positioned on said inner frame member in such a manner as to frictionally engage an inner surface of said outer frame member during said extension and retraction of said inner frame member.

17. A carrier as set forth in claim 16 wherein:
(a) said first friction member is tubular and is fixed within said inner frame member in surrounding frictional engagement with said outer frame member; and
(b) said second friction member is tubular and is fixed in surrounding relation to said inner frame member and in peripheral frictional engagement with said inner surface of said outer frame member.

18. A carrier as set forth in claim 15 and including:
(a) limit means engaged between said outer and inner frame members and limiting extension and retraction of said inner frame member with respect to said outer frame member.

19. A carrier as set forth in claim 18 wherein said limit means includes:
(a) an elongated slot having opposite ends and formed through said inner frame member and extending longitudinally thereof; and
(b) a limit pin extending diametrically through said outer frame member, said pin being oriented to extend through said slot in said inner frame member, engagement of said pin with said ends of said slot limiting said extension and retraction of said inner frame member.

20. A carrier as set froth in claim 15 and including:
(a) load bracket means connected to said outer frame member, said bracket means being adapted to receive and stabilize a load on said carrier.

* * * * *

UNITED STATES PATENT AND TRADEMARK OFFICE
CERTIFICATE OF CORRECTION

PATENT NO. : 5,067,414

DATED : November 26, 1991

INVENTOR(S) : Archie S. Moore, deceased, et al.

It is certified that error appears in the above-identified patent and that said Letters Patent is hereby corrected as shown below:

Title page, Column 1, Section [75], line 2, delete "Mich." and insert --MO-- therefor; line 5, delete "Mich." and insert --MO-- therefor.

Signed and Sealed this

Twenty-eighth Day of April, 1992

Attest:

HARRY F. MANBECK, JR.

*Attesting Officer*　　　　*Commissioner of Patents and Trademarks*